United States Patent [19]
Hamilton

[11] Patent Number: 6,059,518
[45] Date of Patent: *May 9, 2000

[54] METHOD AND APPARATUS FOR UNIFORMLY ORIENTING SHAFTS WITH DISSIMILAR ENDS

[75] Inventor: James D. Hamilton, Buchanan, Tenn.

[73] Assignee: Emerson Electric Co., St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 09/213,741

[22] Filed: Dec. 17, 1998

[51] Int. Cl.$^7$ ........................................................ B25J 11/00
[52] U.S. Cl. ...................... 414/754; 198/397.03; 414/816
[58] Field of Search .................... 198/384, 387, 198/393, 397.04, 397.03, 397.05, 397.01; 414/754, 816

[56] References Cited

U.S. PATENT DOCUMENTS

| | | |
|---|---|---|
| 3,161,274 | 12/1964 | Lanz . |
| 3,656,604 | 4/1972 | Sterling ............................. 198/397.05 |
| 4,275,751 | 6/1981 | Bergman . |
| 4,394,933 | 7/1983 | Ackley ................................... 221/173 |
| 4,466,453 | 8/1984 | Said et al. . |
| 4,632,028 | 12/1986 | Ackley ............................... 198/397.04 |
| 4,790,439 | 12/1988 | McIntyre et al. ...................... 209/667 |
| 5,062,521 | 11/1991 | Hockman ............................... 198/389 |
| 5,097,938 | 3/1992 | Grüner et al. ..................... 198/397.04 |
| 5,117,961 | 6/1992 | Nicholson .............................. 198/372 |
| 5,351,409 | 10/1994 | Heredia . |
| 5,678,697 | 10/1997 | Fuchs et al. ............................ 209/705 |
| 5,713,454 | 2/1998 | Jordan .................................... 198/391 |
| 5,727,668 | 3/1998 | Demarest et al. ..................... 198/431 |
| 5,775,478 | 7/1998 | Shinjo .................................... 198/389 |

OTHER PUBLICATIONS

"Component Orienting Apparatus", IBM Technical Disclosure Bulletin, vol. 15, No. 1, B. Demchyshyn, Jun. 1972.

*Primary Examiner*—Janice L. Krizek
*Attorney, Agent, or Firm*—Arnold White & Durkee

[57] ABSTRACT

The invention, in its various embodiments is a method and apparatus for uniformly orienting shafts which contain an operational feature on one end and which are blunt on the other end. In one aspect of the present invention, a machine feeds the shafts onto a surface containing one or more slots, where the slots are shaped to completely receive a shaft only when the shaft is in a preferred orientation. Shafts which are in the preferred orientation are oriented 180° differently from shafts which are not in the preferred orientation. Shafts which are not in the preferred orientation will be dislodged from the slots and sent down a first exit chute. Shafts which are in the preferred orientation are sent down a second exit chute. The method comprises dispensing the shafts into slots on a surface where the slots are shaped to completely receive a shaft only when the shaft is in a preferred orientation, and selectively removing shafts which are not in the preferred orientation from the slots.

18 Claims, 5 Drawing Sheets

METHOD AND APPARATUS FOR UNIFORMLY ORIENTING SHAFTS WITH DISSIMILAR ENDS

BACKGROUND OF THE INVENTION

1. Field of the Invention

This invention relates generally to a machine for uniformly orienting asymmetric objects, and more particularly, to a machine for uniformly orienting shafts with dissimilar ends. The invention further relates to a method for uniformly orienting shafts with dissimilar ends.

2. Description of the Related Art

A screwdriver blade comprises a shaft of metal, with one end of the shaft containing an operational feature while the other of the shaft is blunt. Examples of operational features include a point with a cross-shaped slot (a Phillips head) or a flat blade. If the screwdriver blade shaft has a circular cross-section, the screwdriver blade may also have two small protuberances near the blunt end of the shaft that are known as wings. After the screwdriver blade is attached to a handle, the wings will prevent the screwdriver blade from rotating relative to the screwdriver handle when torque is applied to the handle. Wings may not be needed if the shaft has a non-circular, for example a hexagonal, cross-section.

In the manufacture of screwdrivers, screwdriver blades are attached to the handle in an automatic assembly machine. Before the screwdriver blades are input into the automatic assembly machine, all of the blades must be oriented in the same direction. Screwdriver blades are oriented in the same direction if, when the screwdriver blades are placed so that the shafts of the blades are parallel to each other, the operational ends of the screwdriver blades are pointing in the same direction. Unfortunately, the manufacturing processes preceding the automatic assembly machine leave the screwdriver blades randomly oriented. Currently, the screwdriver blades must be oriented by hand. This manual orientation procedure is slow and labor-intensive. In a high volume manufacturing line, the process of manually orienting screwdriver blades requires the full time attention of several operators.

What is desired, therefore, is an apparatus and a method that will uniformly orient, with a minimum of human labor, screwdriver blades or any other shaft which contains an operational feature on one end and is blunt on the other end.

SUMMARY OF THE INVENTION

Accordingly, it is an object of the present invention to provide a method and apparatus for uniformly orienting shafts with dissimilar ends that is less labor-intensive than current methods. Another object of the present invention is to provide a fast and reliable method and apparatus for uniformly orienting shafts with dissimilar ends. Yet another object of this invention is to provide a method and apparatus that can sort shafts of different sizes and shapes according to their orientation.

The invention, in its various embodiments, is a method and apparatus for uniformly orienting shafts which contain an operational feature on one end and which are blunt on the other end. In one aspect of the present invention, a machine feeds the shafts onto a surface containing one or more slots, where the slots are shaped to completely receive a shaft only when the shaft is in a preferred orientation. Shafts that are in the preferred orientation are oriented 180° differently from shafts which are not in the preferred orientation. Shafts that are not in the preferred orientation will be dislodged from the slots and sent down a first exit chute. Shafts that are in the preferred orientation are sent down a second exit chute. The method comprises dispensing the shafts into slots on a surface where the slots are shaped to completely receive a shaft only when the shaft is in a preferred orientation, and selectively removing shafts which are not in the preferred orientation from the slots.

Figure 1A:
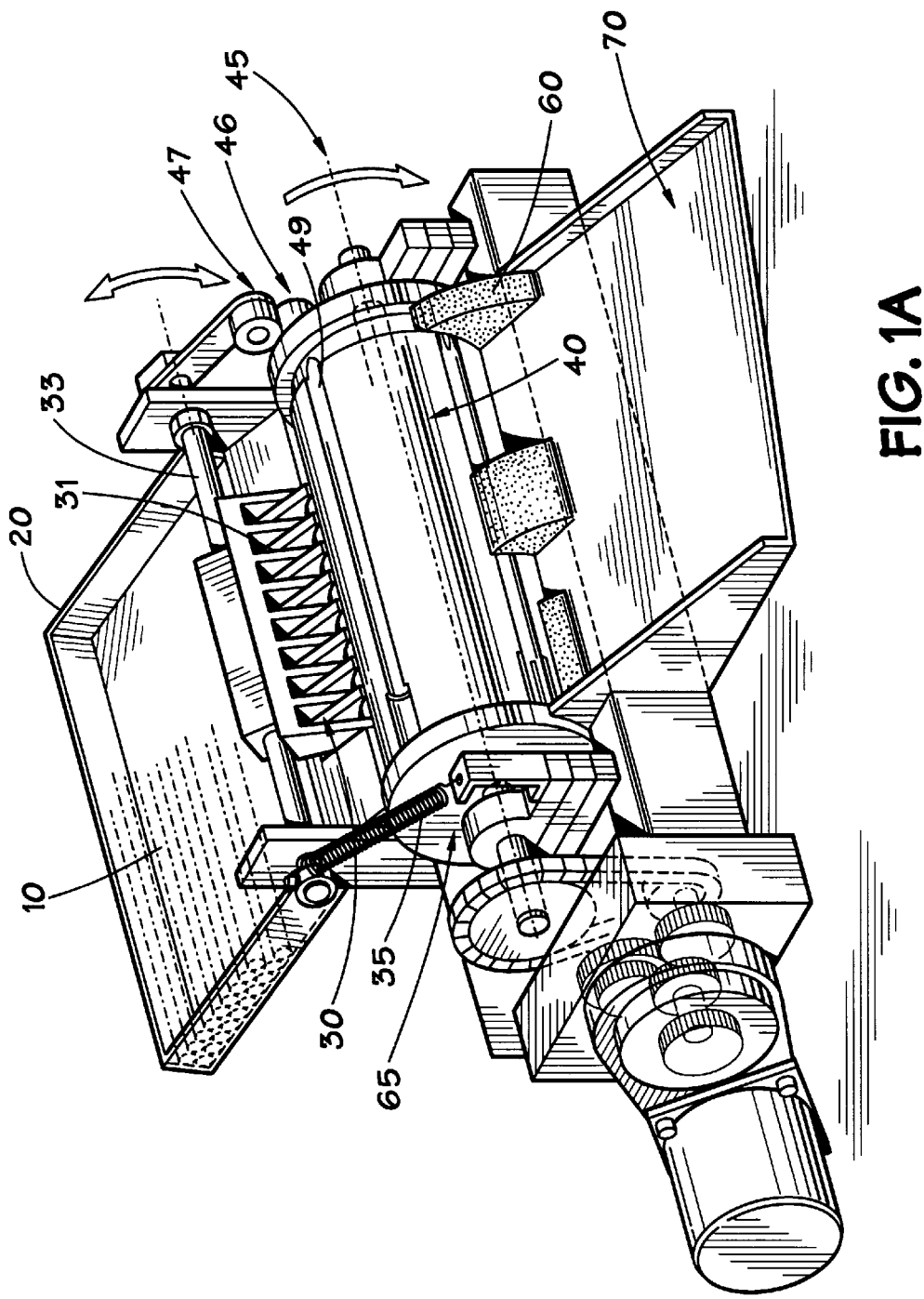
FIG. 1A is a perspective view of an apparatus for uniformly orienting screwdriver blades constructed and operated in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The need to uniformly orient shafts with dissimilar ends arises in the manufacture of screwdrivers. When screwdriver blades arrive at the point in the manufacturing process in which the blades are to be joined with the screwdriver handles, the blades are in a disoriented state. When blades in this disoriented state are placed in a container so that the shafts of the blades are parallel to each other, the screwdriver blades will generally not all be facing in the same direction. The typical situation is illustrated in FIG. 1A, in which Philips screwdriver blades 10 have been placed into a hopper 20 so that the shafts of the blades lie parallel to each other. Some of the Philips screwdriver blades 10 have their operational end on the right side of the hopper 20, while other screwdriver blades 10 have their operational end on the left side of the hopper 20.

Figure 2A:
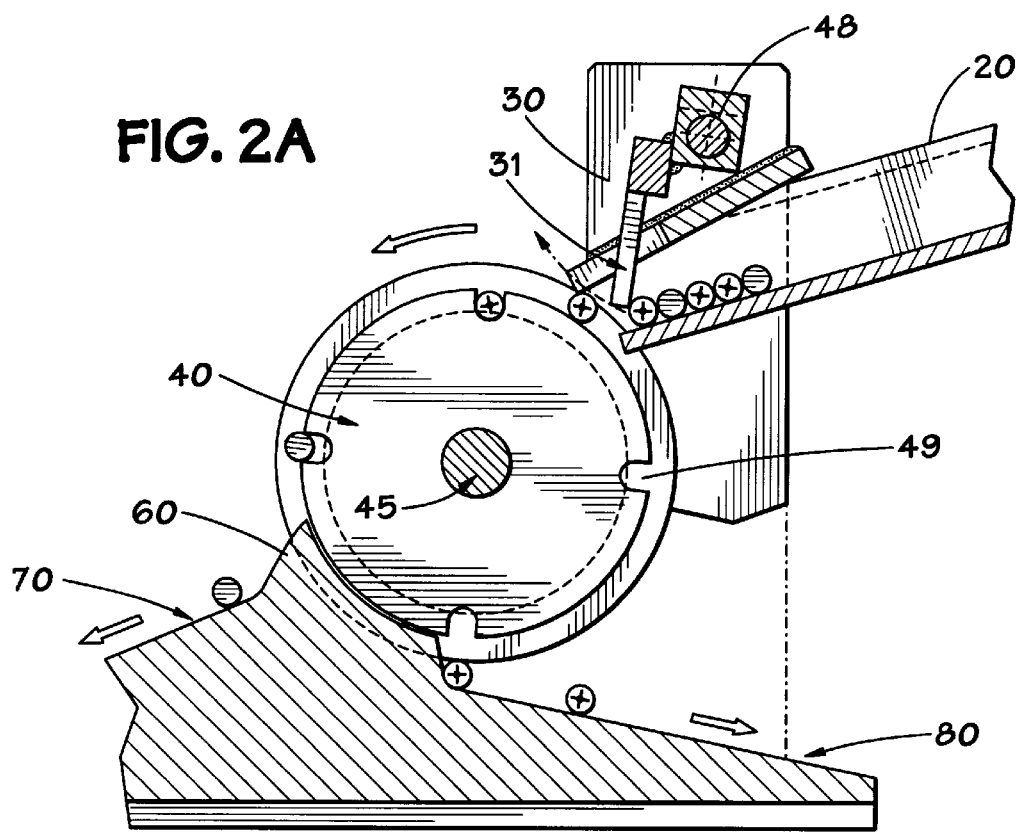
FIG. 2A is a cross-sectional view of the apparatus for uniformly orienting screwdriver blades shown in FIG. 1A.

In the embodiment illustrated in FIG. 1A, and in cross section in FIG. 2A, randomly oriented screwdriver blades are placed in the hopper 20. The blades roll down the inclined floor of the hopper 20 until the blades encounter a feed mechanism 30. The feed mechanism 30 regulates the flow of screwdriver blades onto the surface of a rotating drum 40.

The rotating drum 40 is cylindrical in shape, and rotates about an axis 45 which passes directly through the center points of the two circles on the ends of the drum. The rotating drum 40 has a number of slots 49 patterned into its surface. The slots 49 in the rotating drum 40 run parallel to the axis of rotation 45, and the slots are equally spaced along the circumference of the rotating drum.

The feed mechanism 30 delivers the screwdriver blades onto the surface of the rotating drum 40 at a rate equal to the rate at which the slots 49 pass under the feed mechanism 30. In other words, the feed mechanism 30 delivers exactly one screwdriver blade to each slot 49 that passes under the feed mechanism 30. The delivery of exactly one blade per slot is accomplished by mechanically coupling the feed mechanism 30 to the rotating drum 40. As shown in FIG. 1A, the coupling in this embodiment comprises a cam 46. The cam 46 is attached to the side of the rotating drum 40. As the cam 46 rotates with the drum 40, projections on the surface of the cam 46 cause a lever arm 47 to move upward. The lever arm 47 is coupled to the feed mechanism 30 by a shaft 33, so upward movement of the lever arm 47 causes a swinging arm 31 in the feed mechanism 30 to move upward. As best seen in FIG. 2A, upward movement of the swinging arm 31 allows a screwdriver blade to exit the hopper 20 and fall onto the surface of the rotating drum 40. A spring 35, best seen in FIG. 1A, applies downward pressure to the swinging arm 31. The downward pressure on the swinging arm 31 prevents the screwdriver blades in the hopper 20 from falling onto the surface of the rotating drum 40 unless the lever arm 47 is pushed upward by projections on the cam.

A screwdriver blade placed onto the surface of the rotating drum 40 is deposited by the feed mechanism 30 in a space between two slots. After the screwdriver blade is placed between two slots, the plurality of metal fingers on the swinging arm 31 prevent the blade from rotating with the cylinder. The fingers are aligned in a direction parallel to the axis of rotation of the cylinder. The motion of the surface of the cylinder causes the screwdriver blade to contact the fingers, thus aligning the screwdriver blade with the axis of rotation 45 of the cylinder. Since the slots 49 on the rotating cylinder are also aligned with the axis of rotation of the cylinder, the fingers ensure that the shaft of the screwdriver blade is parallel to the length of the slots. As will be recognized by those in the art, metal fingers will not be needed to align the screwdriver blades if the feed mechanism can adequately align a screwdriver blade with a slot.

Figure 1B:
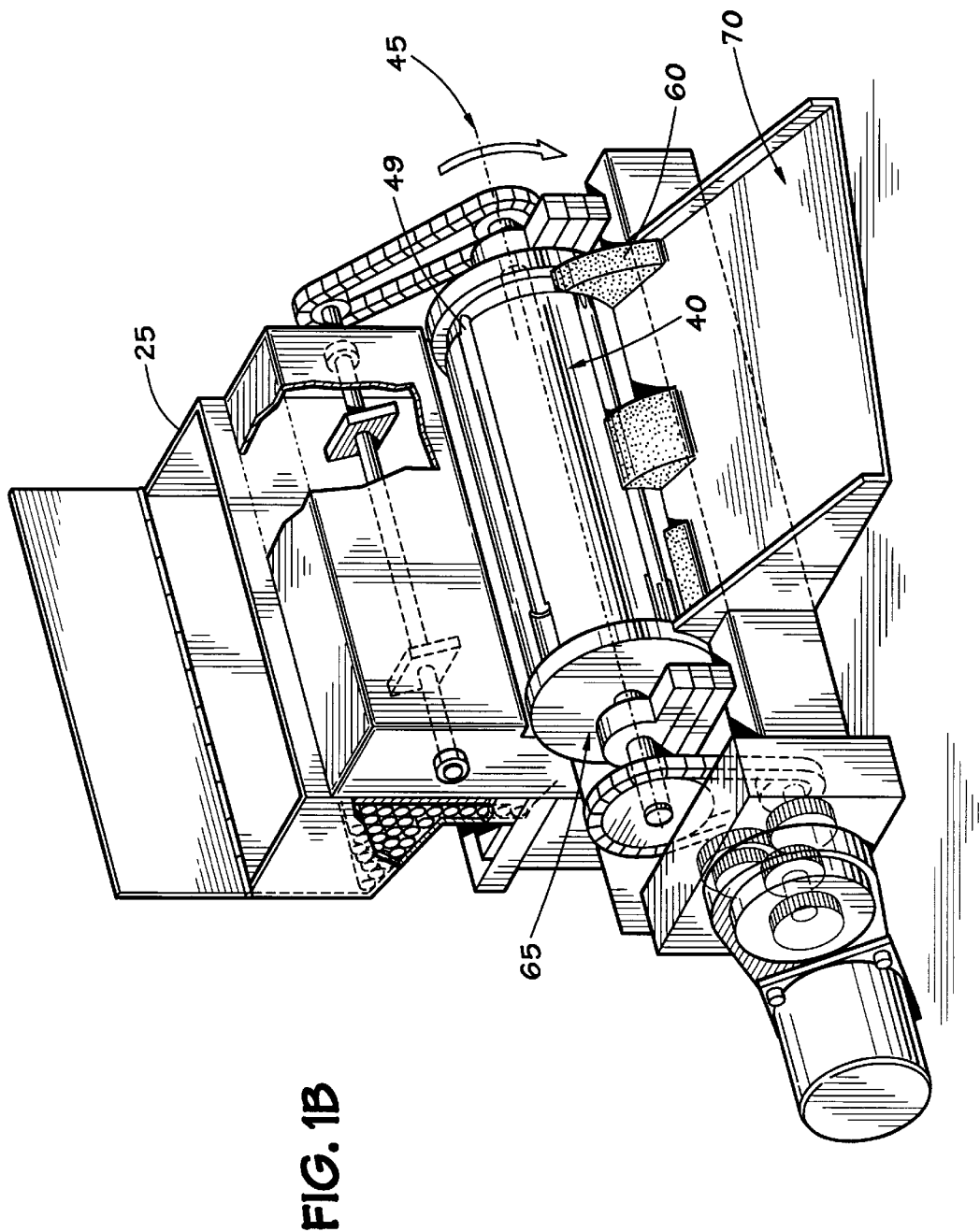
FIG. 1B is a perspective view of an apparatus for uniformly orienting screwdriver blades constructed and operated in accordance with another embodiment of the present invention.
Figure 2B:
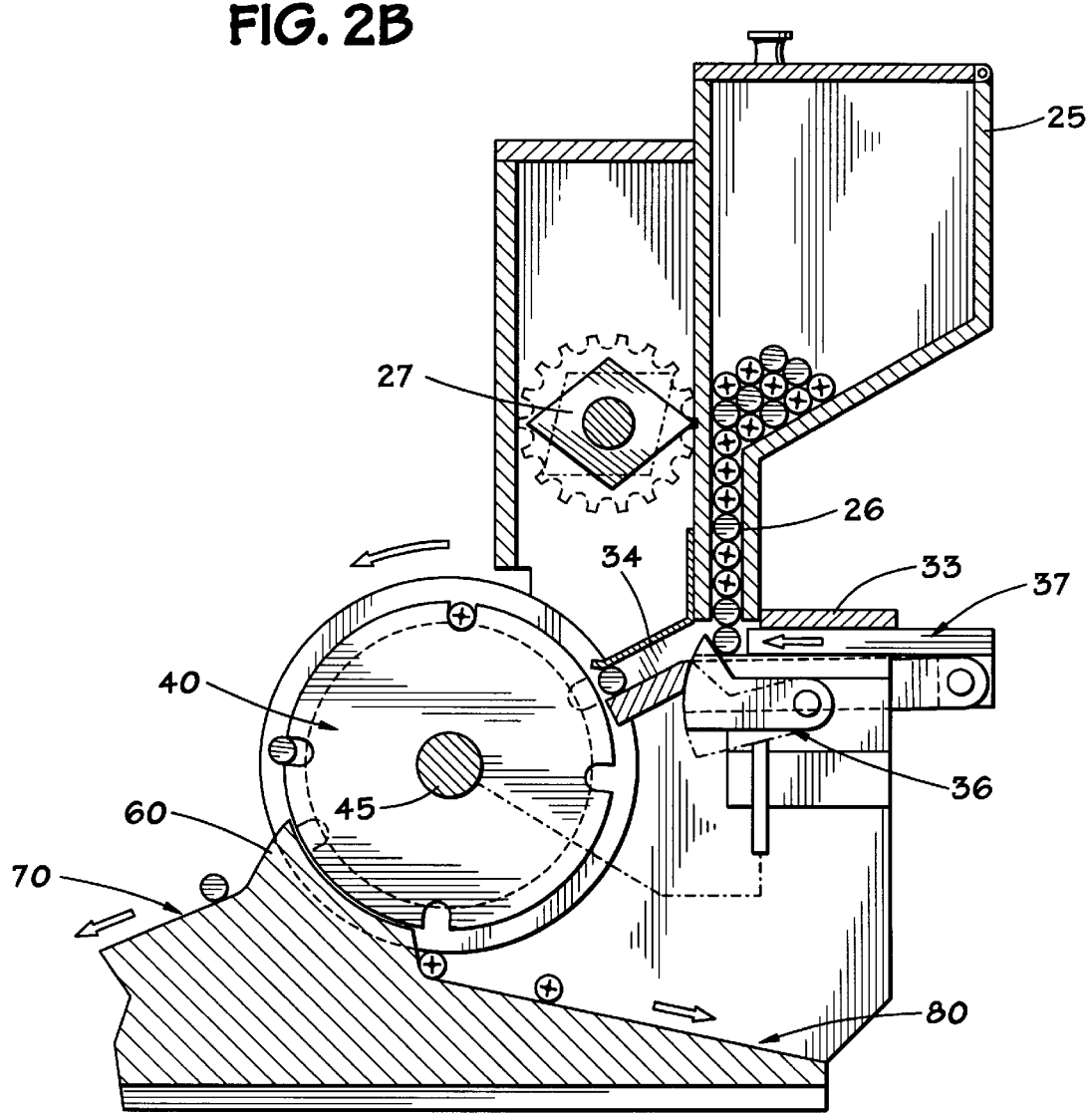
FIG. 2B is a cross-sectional view of the apparatus for uniformly orienting screwdriver blades shown in FIG. 1B.

A variation of the above embodiment, modified to provide for higher throughput, is shown in perspective view in FIG. 1B, and in cross section in FIG. 2B. In this variation, screwdriver blades are placed in a hopper 25 so that the shafts of the blades lie parallel to each other. As best seen in FIG. 2B, the screwdriver blades in the hopper 25 tend to funnel by gravity into a channel 26 at the bottom of the hopper. To ensure that the screwdriver blades move down the channel 26, the hopper 25 can be agitated by means of a rotating cam 27. At the bottom of the channel 26 is a feed mechanism 33. The function of the feed mechanism 33 is to propel a single screwdriver blade at a time down a slide 34. A blade on the slide 34 will roll onto the surface of the rotating drum 40. This function is accomplished by coupling the feed mechanism to the rotation of the drum 40. The coupling (not shown) causes a screwdriver blade to be placed on the surface of the drum by simultaneously making the gate arm 36 drop down and the pusher 37 move forward. The movements of the gate arm 36 and pusher 37 propel a single screwdriver blade out of the hopper 25. When the blade exits the hopper 25 it rolls down the slide 34 onto the surface of the rotating drum 40. The lower lip of the slide 34 aligns the blade with the slot, in a similar manner to the fingers in the previously described embodiment, so that the blade is parallel to the length of the slots 49 in the rotating drum 40.

For a screwdriver blade in the preferred orientation to be completely aligned with a slot 49 in the rotating drum 40, it is also critical that the blade be aligned with the slot in the direction parallel to the axis of rotation 45. To ensure that the screwdriver blades are consistently positioned in that direction, the axis of the rotating drum 45 is tilted away from being exactly horizontal. The tilt in the rotating drum causes the screwdriver blades to slide toward the lower side of the drum, thus ensuring that all of the screwdriver blades placed on the surface of the drum will lie flush against the lower side plate 65, which is best seen in FIGS. 1A and 1B. Positioning the screwdriver blades flush against the lower side plate 65 provides a constant axial position for the screwdriver blades on the drum surface. In the embodiments illustrated in FIGS. 1A and 1B, a tilt of 10° in the axis of the drum is sufficient to cause the screwdriver blades to slide against the lower side plate 65.

The two embodiments described above differ in the configuration of their hoppers, and in their methods of dispensing the screwdriver blades onto the surface of the rotating drum 40. The following discussion, however, of how the process of uniformly orienting screwdriver blades proceeds after the blades are placed on the surface of the rotating drum 40 applies equally to both of the above embodiments.

Figure 5:
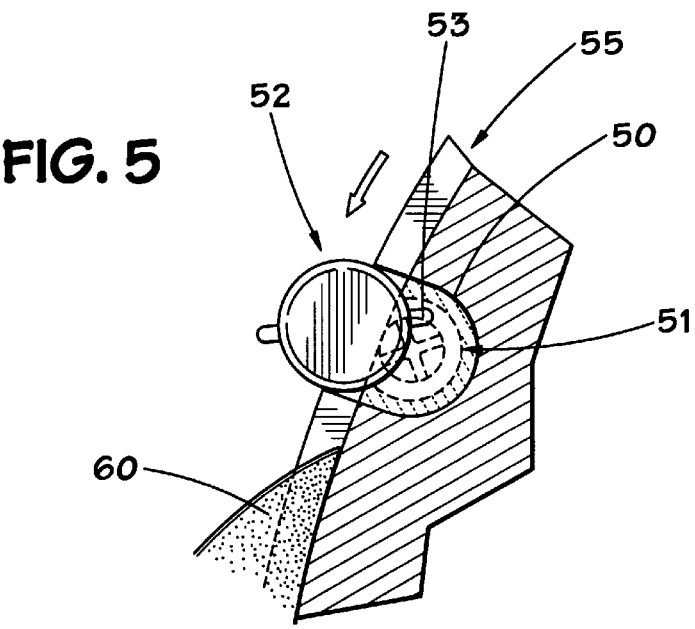
FIG. 5 is a cross-sectional view of a slot on the surface of the rotating drum. Cross-sections of Philips screwdriver blades in two different orientations are shown.
Figure 3:
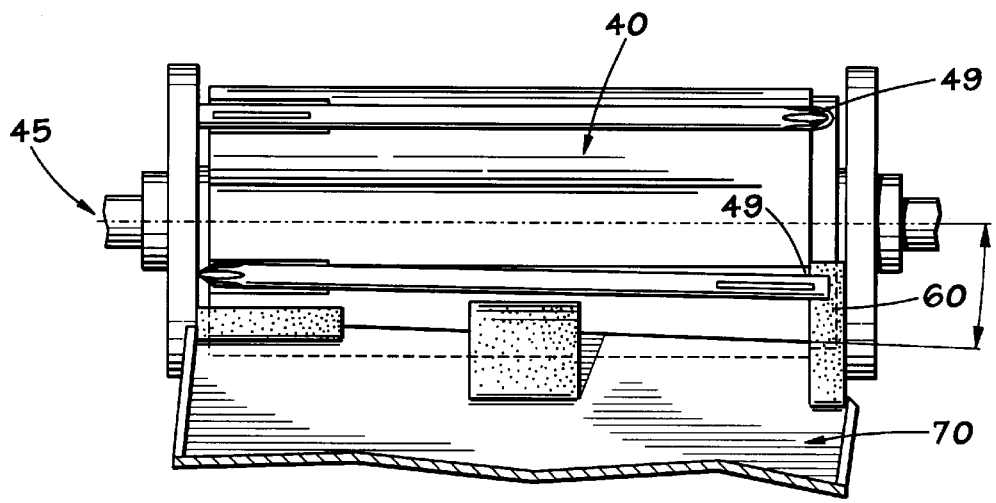
FIG. 3 is a close-up view of the rotating drum in FIGS. 1A and 1B. In this view of the drum, two slots on the surface of the drum are visible. A screwdriver blade is in the process of being dislodged from the lower slot by a pawl.
Figure 4:
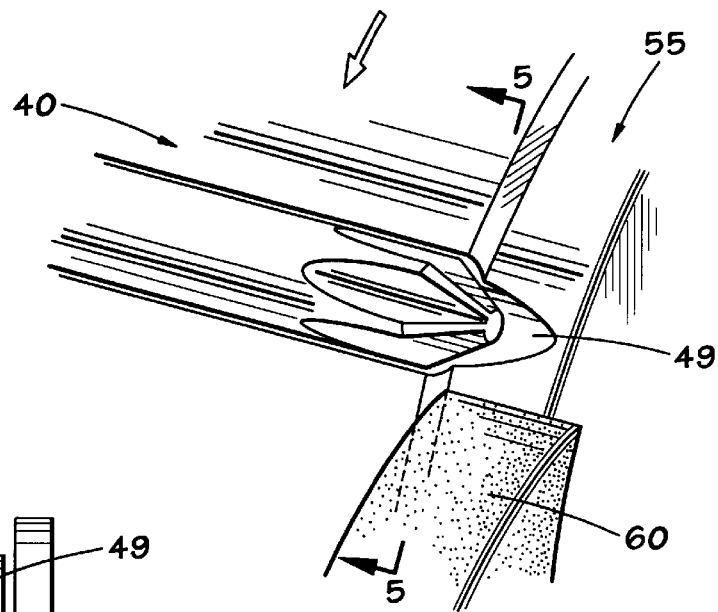
FIG. 4 is an extreme close-up view of one end of a slot on the surface of the rotating drum. A screwdriver blade resides within the slot.
Figure 6:
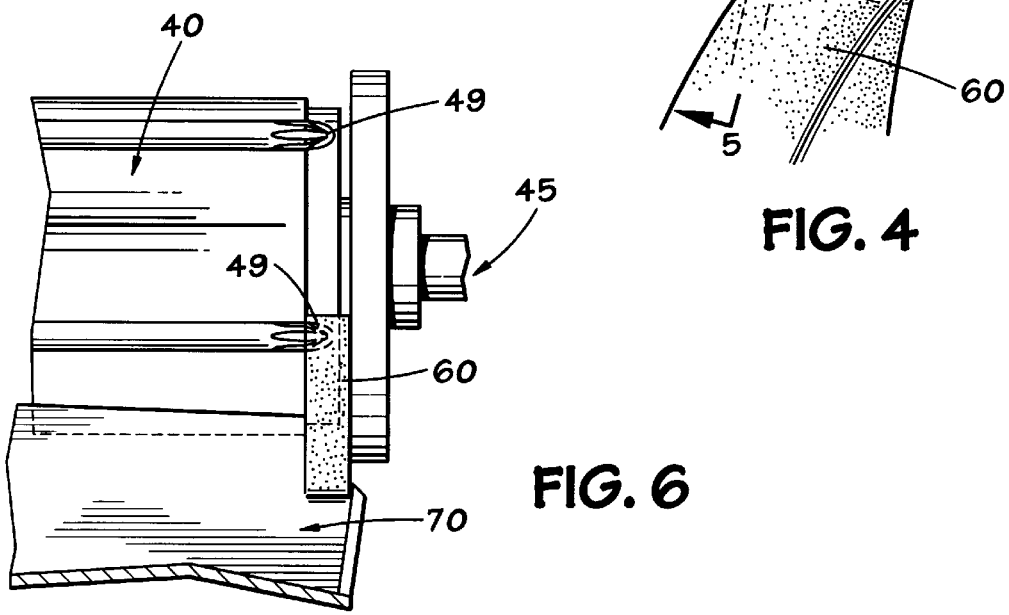
FIG. 6 is a close-up view of a section of the rotating drum in FIGS. 1A and 1B. In this view of the drum, two slots on the surface of the drum are visible. A screwdriver blade in one of the slots is passing underneath the pawl.

In the illustrated embodiments, the shape of the slots 49 allows a screwdriver blade to fit completely within a slot 49 only when the screwdriver blade is in a particular orientation, while a screwdriver blade that is not in that particular orientation will not be able to fit completely within a slot 49. As can be seen in FIGS. 1A, 1B, and 3, the slots 49 in the rotating drum are in the shape of an outline of a screwdriver blade. Features of the screwdriver blade are reflected in the shape of the slots. The shape of the slots can be seen in FIGS. 1A and 1B, where the left side of the slots 49 are wider, to accommodate the wings on the blade, while the right side of the slots 49 are narrower, to reflect the narrowing contour of the operational end of the Philips blade. FIG. 4 is a close-up view of the narrow end of the slot 49. The blade in FIG. 4 is oriented so that the blade is completely received within the slot 49. The rotating drum 40 contains a groove 55 on the end of the drum adjacent to the narrow end of the slot. When a Philips head screwdriver blade is oriented so that the blunt end of the screwdriver blade is within the narrow end of the slot 49, the blade cannot fit completely within the slot 49. This situation is illustrated in FIG. 5, a cross section of the narrow end of the slot through the plane defined by the line labeled 5 in FIG. 4. At the narrow end of the slot, the diameter of the slot narrows from a diameter 50 to a diameter 51, which is only wide enough to receive the tapered end of the blade 53. Since the blunt end of the shaft 52 does not fit into the narrow end of the slot 49, the blunt end of the shaft juts out above the surface of the groove 55. In contrast, a screwdriver blade oriented so that its operational end 53 is within the narrow end of the slot 49 will lie beneath the surface of the groove 55. When the screwdriver blade is oriented so that the narrow end of the blade lies within the narrow end of the slot, the blade can be said to be in the preferred orientation. So, for example, the blade in the uppermost slot in FIG. 3 is in the preferred orientation, while the lowermost blade in FIG. 3 is not in the preferred orientation. For embodiments which are designed to orient other types of shafts with dissimilar ends, in other words shafts other than screwdriver blades, a shaft will be in the preferred orientation when the orientation of the shaft coincides with the orientation of the outline incorporated into the slot in which the shaft resides.

As the drum rotates, the screwdriver blades within the slots are moved toward a pawl 60. As best seen in FIG. 5, the space between the pawl 60 and the surface of the groove in the rotating drum 55 is such that a screwdriver blade in the preferred orientation will pass below the pawl 60, while a screwdriver blade that is not in the preferred orientation will strike the pawl 60. The pawl 60 is positioned so that when it strikes a screwdriver blade, that screwdriver blade will be dislodged from the slot in which it resides. Thus the distance between the pawl and the surface of the groove in the rotating drum 55 is large enough to allow screwdriver blades in the preferred orientation to pass underneath it, while the distance is small enough so that the pawl strikes the lower half of a screwdriver blade which is not in the preferred orientation. Striking the lower half of a blade dislodges the blade, while striking the upper half of the blade would tend to drive the blade deeper into the slot. To allow the pawl 60 to strike the lower half of a screwdriver blade that is not in the preferred orientation, the pawl 60 must be positioned below the surface of the rotating drum 40. This is why the groove 55 is formed on the surface of the cylinder.

As shown in FIG. 3, a screwdriver blade that is not in the preferred orientation travels down a first chute 70 after being dislodged by the pawl 60. The first chute 70 leads to a first receiving bin (not shown). The angle of the first chute 70 relative to horizontal must be steep enough so that the dislodged screwdriver blades fall by gravity into the first receiving bin, but not so steep that the screwdriver blades change orientation during their journey down the first chute 70.

As shown in FIG. 5, a screwdriver blade in the preferred orientation passes underneath the pawl 60. As best seen in FIGS. 2A and 2B, blades in the preferred orientation remain in their slots until the drum rotation brings the slot 49 to a position in which the slot is facing downward. When the slot is facing downward, gravity will cause the screwdriver blade to fall out of the slot onto a second chute 80. It is important that the slot not fit around a screwdriver blade so tightly that the blade cannot fall easily out of the shaft when the slot is facing downward. The blade will travel down the second chute 80 into a second receiving bin (not shown). Just as for the first chute 70, the angle of the second chute 80 must be steep enough to allow the blade to slide into the second receiving bin, but not so steep that the screwdriver blade changes orientation during its journey down the chute.

The screwdriver blades in the first receiving bin will be oriented in one direction, while the screwdriver blades in the second receiving bin will be oriented in a direction 180° different from the direction of the screwdriver blades in the first receiving bin. Since each of the receiving bins contains uniformly oriented screwdriver blades, it is a trivial matter to combine the contents of the two bins into a single container containing uniformly oriented blades.

The above described embodiments of the invention separate oppositely oriented screwdriver blades into two groups, where all of the screwdriver blades in each group are uniformly oriented. In a modification of the illustrated embodiment, screwdriver blades traveling down one of the two chutes could be reoriented by 180° before the blades reach the receiving bin. In this modified embodiment, all of the screwdriver blades exiting the apparatus would be oriented in the same direction. Consequently, only a single receiving bin would be needed in the modified embodiment. In either the illustrated or modified embodiment, the automatic sorting of screwdriver blades according to their orientation allows a uniformly oriented set of screwdriver blades to be assembled with a minimum of human intervention. As will be recognized by those in the art, application of the invention is not limited to screwdriver blades. Other embodiments of the invention could be applied to uniformly orient other objects which comprise shafts with dissimilar ends.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A machine for uniformly orienting shafts with an operational end and a blunt end comprising:
    a) a surface containing one or more slots,
        where the surface comprises the exterior of a cylindrical drum, the cylindrical drum having two circular ends,
        where the slots each define a first end disposed proximate to one of the circular ends shaped to receive the blunt end of a shaft and a second end disposed proximate to the other circular end shaped to receive the operational end of the shaft, such that the shaft is received completely only when the shaft is in a preferred orientation, and when the shaft is not in the preferred orientation, at least a portion of the shaft extends from the slot, and
        where the slots each define an axis that is substantially parallel to an axis passing directly through the centers of the two circular ends of the cylindrical drum; and
    b) a feed mechanism that dispenses shafts onto the surface so that a single shaft will be received into each of the slots on the surface; and
    c) a pawl which dislodges shafts that are not in the preferred orientation within said slots; and
    d) a first exit chute which receives shafts engaged by the pawl; and
    e) a second exit chute which receives shafts not dislodged by the pawl.

2. The machine of claim 1 wherein the slots are equally angularly spaced along the circumference of said cylindrical drum.

3. The machine of claim 1 wherein the feed mechanism comprises a swinging arm with a plurality of metal fingers.

4. The machine of claim 1 wherein the feed mechanism comprises a pusher mechanism.

5. The machine of claim 1 wherein the shafts received by the first exit chute are collected in a first receiving bin, and shafts received by the second exit chute are collected in a second receiving bin.

6. The machine of claim 1 wherein the shafts received by one of the two exit chutes are reoriented by 180°, and shafts received by both of the exit chutes are collected in a single receiving bin.

7. The machine of claim 1 wherein the pawl is positioned adjacent the surface such that a shaft in the preferred orientation received completely within one of the slots passes under the pawl, and a shaft not in the preferred orientation having at least a portion extending from one of the slots strikes the pawl, thereby dislodging the shaft from the slot.

8. A machine for uniformly orienting shafts with an operational end and a blunt end comprising:

a) a cylindrical drum having first and second circular ends and an exterior surface defining a series of slots each having an axis oriented substantially parallel to an axis of the cylindrical drum, the slots each having a first end disposed proximate the first circular end shaped to receive the blunt end of a shaft and a second end disposed proximate the second circular end shaped to receive the operational end of the shaft, such that said slots are shaped to completely receive a shaft only when said shaft is in a preferred orientation;

b) means for dispensing shafts into the slots such that a single shaft is received into each of the slots; and c) means for dislodging shafts that are not in the preferred orientation within said slots; and d) means for collecting shafts that have been dislodged; and e) means for collecting shafts that have not been dislodged.

9. The machine of claim 8 wherein the cylindrical drum rotates.

10. The machine of claim 8 wherein the means for dispensing shafts into the slots comprises a feed mechanism comprising a pusher mechanism.

11. The machine of claim 8 wherein the means for dispensing shafts into the slots comprises a swinging arm with a plurality of metal fingers.

12. The machine of claim 8 wherein the means for dislodging shafts comprises a pawl.

13. The machine of claim 8 wherein the means for collecting shafts that have been dislodged comprises a chute which leads to a receiving bin.

14. The machine of claim 8 wherein the means for collecting shafts that have not been dislodged comprises a chute which leads to a receiving bin.

15. The machine of claim 8 wherein a shaft received by one of the slots that is not in said preferred orientation extends at least partially from the slot, and wherein the means for dislodging shafts includes means for engaging the portion of the shaft extending from the slot so as to dislodge the shaft from the slot.

16. A method for sorting shafts with an operational end and a blunt end according to their orientation comprising:

a) rotating a cylindrical drum having an exterior surface defining a plurality of slots therein, the slots having a first end shaped to receive the blunt end and a second end shaped to receive the operational end;

b) aligning the shafts generally parallel to an axis defined by the cylindrical drum;

c) dispensing the shafts onto the surface such that each shaft is received by one of the slots, wherein a shaft in a preferred orientation with the blunt end at the first end of the slot and the operational end at the second end of the slot is completely received by the slot, and at least a portion of a shaft not in the preferred orientation extends from the slot;

d) engaging the portion of the shaft extending from the slot, thereby removing shafts which are not in the preferred orientation within the slots from the slots.

17. The method of claim 16 further comprising collecting the shafts that are not in the preferred orientation in a first receiving bin, and collecting the shafts that are in the preferred orientation in a second receiving bin.

18. The method of claim 16 further comprising receiving the shafts that are not in the preferred orientation by a first exit chute; receiving the shafts that are in the preferred orientation by a second exit chute; and reorienting the shafts received by one of the two exit chutes by 180°.

* * * * *